US011295758B2

(12) United States Patent
Gomez et al.

(10) Patent No.: US 11,295,758 B2
(45) Date of Patent: Apr. 5, 2022

(54) TRUSTED LISTENING

(71) Applicant: Seagate Technology LLC, Cupertino, CA (US)

(72) Inventors: Kevin Arthur Gomez, Eden Prairie, MN (US); Eric James Dahlberg, Eden Prairie, MN (US); Adam Robert Bush, Plymouth, MN (US)

(73) Assignee: Seagate Technology LLC, Fremont, CA (US)

( * ) Notice: Subject to any disclaimer, the term of this patent is extended or adjusted under 35 U.S.C. 154(b) by 22 days.

(21) Appl. No.: 16/825,845

(22) Filed: Mar. 20, 2020

(65) Prior Publication Data

US 2021/0295860 A1  Sep. 23, 2021

(51) Int. Cl.
*G10L 19/018* (2013.01)
*G10L 25/51* (2013.01)
*G10L 19/02* (2013.01)
*G10L 19/028* (2013.01)

(52) U.S. Cl.
CPC .......... *G10L 25/51* (2013.01); *G10L 19/0204* (2013.01); *G10L 19/028* (2013.01); *G10L 19/0216* (2013.01)

(58) Field of Classification Search
CPC . G10L 19/02; G10L 19/0204; G10L 19/0216; G10L 19/028; G10L 19/012; G10L 19/018; G10L 25/51; G10L 25/84
USPC ..................................... 381/56, 91–92, 122
See application file for complete search history.

(56) References Cited

U.S. PATENT DOCUMENTS

| 6,185,316 | B1 | 2/2001 | Buffam |
| 6,615,171 | B1 | 9/2003 | Kanevsky et al. |
| 6,948,066 | B2 | 9/2005 | Hind et al. |
| 6,968,453 | B2 | 11/2005 | Doyle et al. |
| 6,990,444 | B2 | 1/2006 | Hind et al. |
| 7,028,184 | B2 | 4/2006 | Hind et al. |
| 7,420,474 | B1 | 9/2008 | Elks et al. |
| 7,437,574 | B2 | 10/2008 | Roenkkae et al. |
| 7,805,614 | B2 | 9/2010 | Aull et al. |
| 7,823,214 | B2 | 10/2010 | Rubinstein et al. |
| 7,966,497 | B2 | 6/2011 | Gantman et al. |
| 8,037,309 | B2 | 10/2011 | Ooi et al. |
| 8,139,723 | B2 | 3/2012 | Fu et al. |
| 8,187,202 | B2 | 5/2012 | Akkermans et al. |

(Continued)

FOREIGN PATENT DOCUMENTS

| EP | 1732352 A1 | 12/2006 |
| GB | 2541466 A | 2/2017 |

OTHER PUBLICATIONS

Schlegel, Roman , et al., "Soundcomber: A Stealthy and Context-Aware Sound Trojan for Smartphones", City University of Hong Kong; 17 pages.

*Primary Examiner* — Disler Paul
(74) *Attorney, Agent, or Firm* — Kirk A. Cesari

(57) ABSTRACT

Devices and methods are disclosed for trusted listening. In some examples, an apparatus can include an audio receiving device having a microphone configured to capture sound and produce an audio signal, a processing unit configured to add a trusted signature to the audio signal, and an output configured to provide the audio signal. Further, a method of trusted listening can receive a first audio signal representing a real-time sound, generate a trusted signature in an audible format, and produce a second audio signal including the trusted signature.

20 Claims, 3 Drawing Sheets

(56) References Cited

U.S. PATENT DOCUMENTS

| | | |
|---|---|---|
| 8,266,442 B2 | 9/2012 | Burke |
| 8,281,148 B2 | 10/2012 | Tuyls et al. |
| 8,315,876 B2 | 11/2012 | Reuss |
| 8,719,569 B2 | 5/2014 | Buer et al. |
| 8,792,305 B2 | 7/2014 | Booij et al. |
| 8,990,912 B2 | 3/2015 | Baentsch et al. |
| 9,042,867 B2 | 5/2015 | Gomar |
| 9,053,310 B2 | 6/2015 | Oberheide et al. |
| 9,118,488 B2 | 8/2015 | Donaldson |
| 9,185,199 B2 | 11/2015 | Zurek et al. |
| 9,262,612 B2 | 2/2016 | Cheyer |
| 9,357,320 B2 | 5/2016 | Gelter |
| 9,444,816 B2 | 9/2016 | Johnsgard et al. |
| 9,747,926 B2 | 8/2017 | Sharifi et al. |
| 9,767,266 B2 | 9/2017 | Hu et al. |
| 9,767,319 B2 | 9/2017 | Chen |
| 9,769,169 B2 | 9/2017 | Khosravi et al. |
| 9,891,882 B2 * | 2/2018 | Fournier ................ G10L 99/00 |
| 10,103,872 B2 | 10/2018 | Pappachan et al. |
| 10,433,089 B2 * | 10/2019 | Wilson .................... H03G 3/32 |
| 2001/0025342 A1 | 9/2001 | Uchida |
| 2002/0095586 A1 | 7/2002 | Doyle et al. |
| 2007/0142943 A1 * | 6/2007 | Torrini ............. G11B 20/00818 |
| | | 700/94 |
| 2007/0180261 A1 | 8/2007 | Akkermans et al. |
| 2010/0042848 A1 | 2/2010 | Rosener |
| 2011/0038594 A1 | 2/2011 | Toupin et al. |
| 2012/0317420 A1 | 12/2012 | Matsuo et al. |
| 2013/0127591 A1 | 5/2013 | Shay et al. |
| 2013/0246800 A1 | 9/2013 | Stewart |
| 2014/0114669 A1 * | 4/2014 | Nelson .................. H04H 60/31 |
| | | 704/500 |
| 2016/0071526 A1 * | 3/2016 | Wingate ................ G01S 3/802 |
| | | 704/233 |
| 2018/0211675 A1 * | 7/2018 | Fukui ...................... H03M 3/02 |
| 2019/0013027 A1 * | 1/2019 | Page ..................... H04L 9/3247 |
| 2019/0013207 A1 * | 1/2019 | Kobayashi ........ H01L 21/02063 |

* cited by examiner

TRUSTED LISTENING

SUMMARY

In certain embodiments, an apparatus can include an audio receiving device having a microphone configured to capture sound and produce an audio signal, a processing unit configured to add a trusted signature to the audio signal, and an output configured to provide the audio signal at the output.

In certain embodiments, a method can include receiving a first audio signal representing a real-time sound at a first device, processing, via a processor of the first device, the first audio signal, and providing a second audio signal at a sound output of the first device. The processing of the first audio signal can include generating a trusted signature in an audible format, and producing the second audio signal including the trusted signature.

In certain embodiments, a system can include a first device having an input configured to receive a first signal representative of a first audio signal, a processor configured to add a trusted signature to the first signal to produce a second signal, and an output configured to provide the second signal. A second device can include an input configured to receive the second signal, a decoder configured to process the second signal and detect the trusted signature, and an output configured to send an indication of whether the trusted signature was detected.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuit(s) (ASIC(s)), programmable logic arrays, system-on-chip (SoC), and other hardware devices can likewise be constructed to implement the circuits, functions, processes, and methods described herein. Methods and functions may be performed by modules or engines, both of which may include one or more physical components of a computing device (e.g., logic, circuits, processors, controllers, etc.) configured to perform a particular task or job, or may include instructions that, when executed, can cause a processor to perform a particular task or job, or may be any combination thereof. Further, the methods described herein may be implemented as a computer readable storage medium or memory device including instructions that, when executed, cause a processor to perform the methods.

Experts are having an increasingly difficult time detecting audio or video streams that have been altered from their original content. One only has to browse certain channels on the internet to find altered videos and audio streams that are completely false but indistinguishable from authentic content, which are now known as deep fakes. Thus, solutions to deal with this deep fake problem are presented so that consumers of the content can know with certainty whether it is authentic.

The solutions provided herein address audio manipulation, such as from a recording of a live presenter. A trusted listening device (TLD) can provide a way for allowing content creators to sign original content. Trusted listening systems and methods can also provide for consumers of the content to determine the authenticity of the audio that is being consumed or received.

Figure 1:
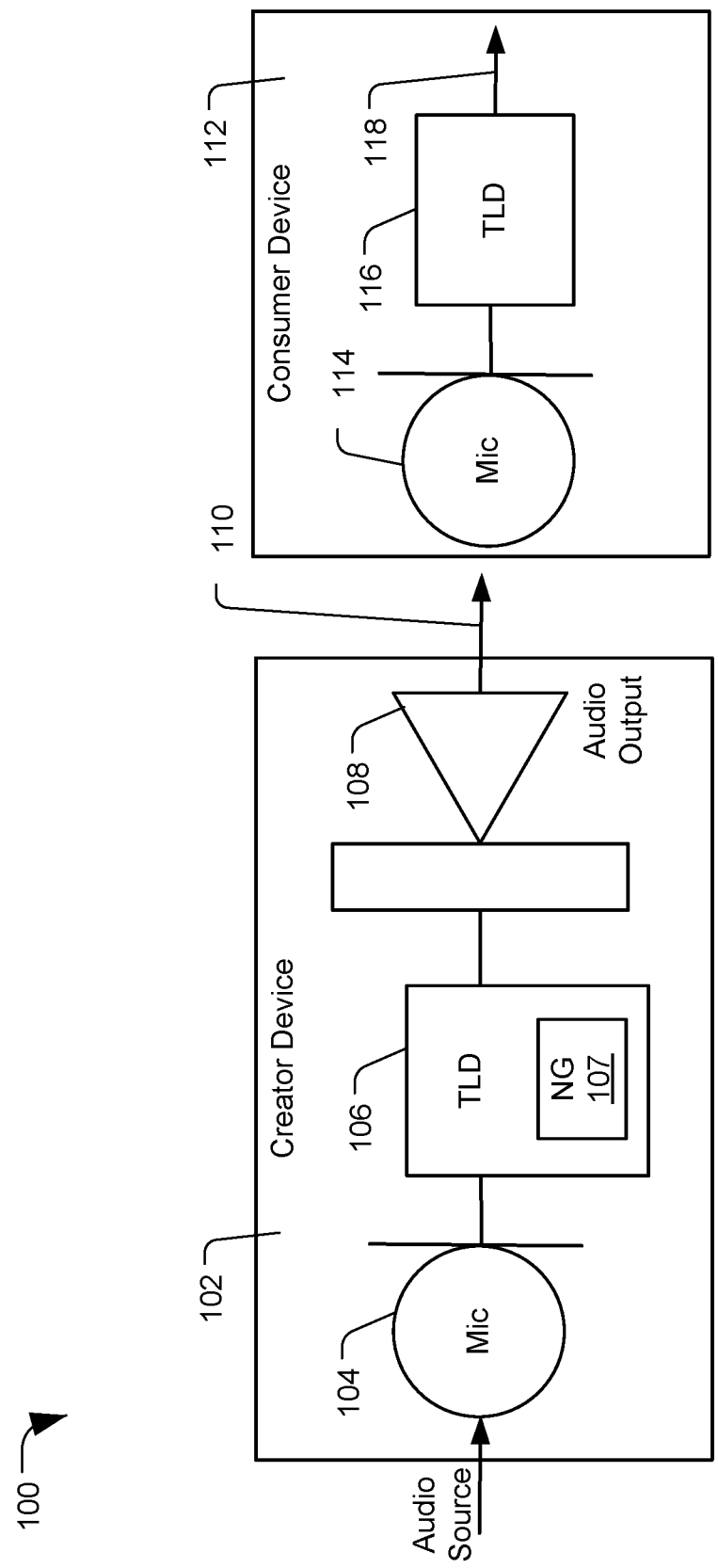
FIG. 1 is a diagram of a system of trusted listening, in accordance with certain embodiments of the present disclosure.

FIG. 1 shows a diagram of a system of trusted listening 100, in accordance with certain embodiments of the present disclosure. The system 100 can include a creator device 102 that may include a microphone 104, a TLD circuit 106 (e.g., controller, processor, integrated circuit, or any combination thereof), and an audio output 108. The TLD 106 may also include a noise generator 107. System 100 can also include a consumer device 112, which may include a microphone 114 and a TLD circuit 116 (e.g., controller, processor, integrated circuit, or any combination thereof), and an output 118.

During operation, the system 100 can protect creators of audio content from unauthorized alteration of audio streams and can protect consumers of audio streams by providing an authentication means. When the creator device 102 receives an audio signal from an audio source, such as from a live speaker speaking into the microphone 104, the TLD 106 can receive the audio signal and generate a signature based on the audio content. In some embodiments, the signature can be added directly into the audio signal, which the audio signal may then be provided at the audio output 108, which may be an audio amplifier in-line with the TLD circuit 106 and the live speaker's microphone 104 as shown in FIG. 1. The difference between an in-line TLD circuit 106 and a not in-line TLD circuit 206 can be discerned from the different implementations shown in FIG. 1 (in-line) and FIG. 2 (not in-line). The audio output 108 can be a speaker, audio amplifier, or any other means for transmitting an audio signal (e.g., radio transmission, wire transmission, etc.).

The TLD 106 can generate the signature, such as by using wavelets, where the audio source frequency content is monitored for major frequency constituents and a trusted signature is encoded into those frequencies. The audio stream 110 can then pass to the consumer device 112 where a second TLD 116 (e.g., a decoder circuit) can be used to decode the received signal and detect authenticity. In some embodiments the noise generator 107 may add a white noise component to the audio stream 110.

To elaborate in more mathematical detail, the system 100 can be described as follows: Let, $s\_t$=the sound captured at the source (e.g., via microphone 104);

$s\_s$=the sound emitted from the audio system (e.g., via audio output 108);

$s\_r$=the sound received at the recorder (consumer) end (e.g., via microphone 114);

f( )=a secret, invertible transfer function introduced by the TLD and known only by the TLD devices (e.g., TLD 106 and TLD 116); and w_k=a known, white noise function introduced by the TLD (e.g., via noise generator 107).

The audio output 110 (e.g. speaker emitted sound) will be: s_s=s_t+f(s_t)+w_k, where function f( ) is an invertible function which converts s_t to a signal that looks like white noise. Function f( ) will be known only to the TLD devices 106 and 116.

Now, let's consider the case where there is an adversarial device between the audio input (s_r) and the speaker which wants to replace s_t with an adversarial signal s_a. The best the adversarial device can do is sense s_s and s_t, subtract s_t and add s_a, resulting in s_s_adversarial=s_a+f(s_t)+w_k Thus, consumer device 112 can receive one of two possible signals, 1. s_r=s_s (the true signal) or 2. s_r=s_s_adversarial (the false or corrupted signal). Because the consumer device 112 includes the TLD 116, it knows function f( ) and w_k and it can perform the following equivalence check: s_r−w_k−f(s_t)==f_inv(f(s_t)), which may be referred to as decoding the received audio signal or detecting a trust component in an audio signal. The equivalence check can be implemented using autocorrelation and a threshold. Thus, if s_r−w_k−f(s_t)=f_inv(s_t), then the signal can be determined to be authentic. In the case where s_r=s_s, the equivalence check will pass and the signal can be authenticated, but for s_r=s_s_adversarial the equivalence check will fail and the signal cannot be authenticated.

Some examples of autocorrelation with a threshold can include an autocorrelation equivalency check. When the system 100 compares a transmitted signal with a detected signal as detected via a microphone, etc., in one example case, the system may require that the signals match exactly, in another example case, the system may require that the signals be "close" to be determined equivalent. The degree to which the signals are "close" can be variable and determinative based on the specification requirements of the system 100.

For the first example, which can implement a more strict case of equivalency check, the system 100 can require that max(cross_correlation(s_transmitted, s_received))==max(cross_correlation(s_transmitted, s_transmitted)) for equivalency to be declared.

In the second example, the equivalency check can be implemented as a scalar threshold. For example, where "alpha" is the scalar and is in the range of zero to one (0, 1). Then the system's check can become max(cross_correlation(s_transmitted,s_received))>=alpha*max(cross_correlation(s_transmitted, s_transmitted)) where equivalency is declared when the check is true, and alpha can be selected per the needs of the particular implementation. Further, the equivalency check becomes more strict as alpha approaches 1.

In some examples, the TLD 106 can embed a trust component (e.g., a signature) in the audio signal by wavelet analysis of the incoming data. For example, an analysis can be performed on the incoming signal, s_t, to find a number of highest energy bins. Modulation of a small amplitude (f(s_t)) can be applied to one or more of the bins before being transmitted as s_s. This modulated signal can be made large enough, through a calibration step, that the consumer device 112 can record s r and verify the encoding f(s_t).

A calibration procedure can be performed between the creator device 102 and the consumer device 112 to ensure the consumer device 112 can detect the altered signal. For example, the gain of the creator device 102 cane be adjusted until the authenticated signal is detected at the consumer device 112.

Such a setup has an advantage in public speaking settings where special equipment is not required of all in the room but only by those wishing to verify authenticity of their recorded signals. In some embodiments, the TLD 106 can be a stand-alone device and placed in-line with a speaker's microphone and sound system. Thus, anyone in the audience can verify the authenticity of their recorded audio stream during the speaking event. Also, distribution of the recorded event then contains the embedded authentication and is detectable by any other consumer with a TLD.

Another method of embedding a trust component would be using equipment capable of creating and detecting ultrasonic or infrasonic frequencies. For example, a mesh network of devices could transmit an encoding chirp detectible with modern listening devices.

In other embodiments, a TLD may be embedded in a microphone itself. Such a device can be implemented to be rendered useless if tampered with, offering a high level of authenticity of the signal coming from the microphone. There are many ways to embed this functionality in various devices, each having different security, cost, and implementation advantages. Further, the systems described herein may be made less vulnerable to attacks via implementing similar systems and methods employed by security chips.

Figure 2:
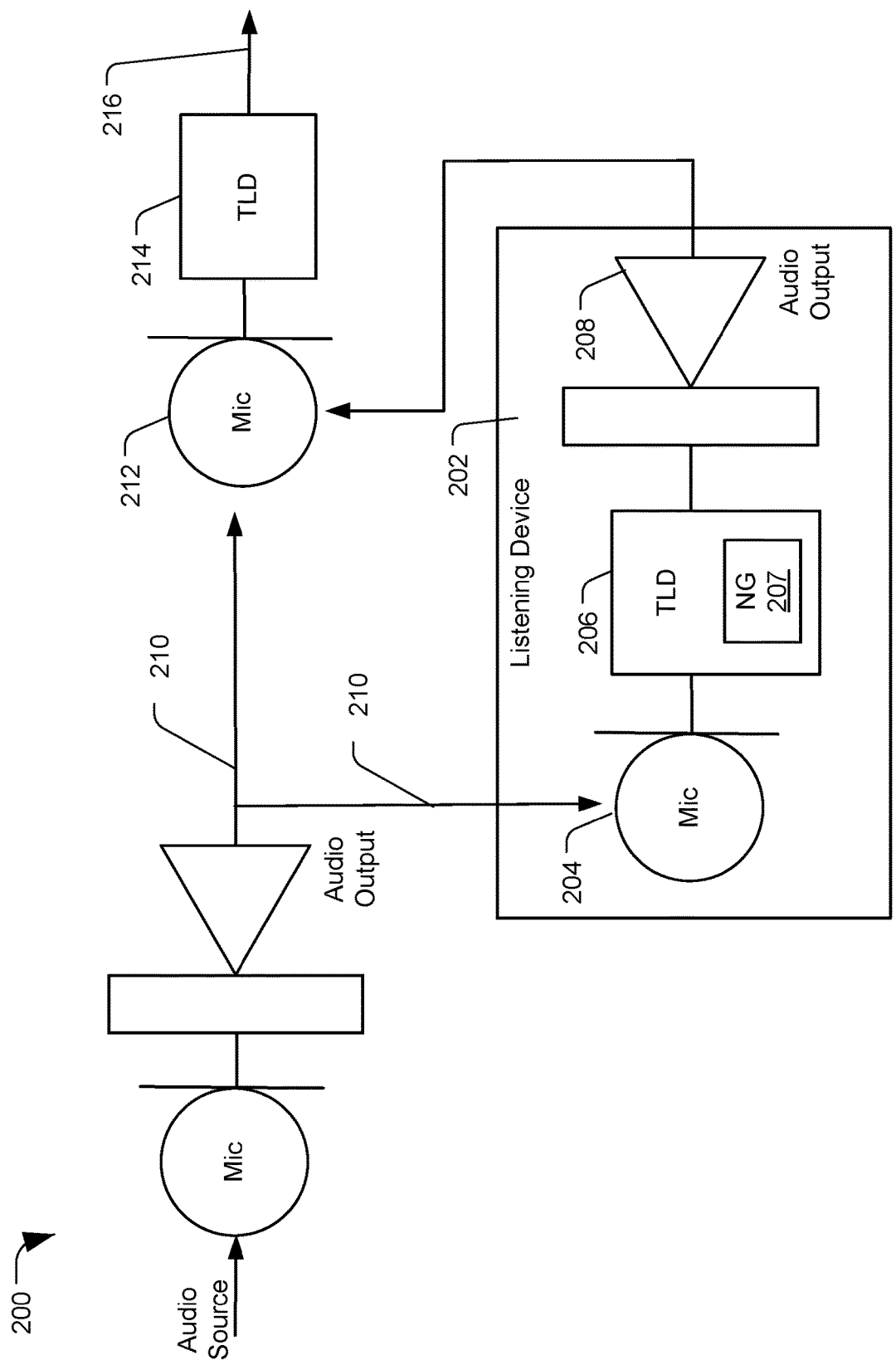
FIG. 2 is a diagram of a system of trusted listening, in accordance with certain embodiments of the present disclosure.

FIG. 2 shows a diagram of a system of trusted listening 200, in accordance with certain embodiments of the present disclosure. The system 200 can include a listening device 202 that may include a microphone 204, a TLD circuit 206 (e.g., controller, processor, integrated circuit, or any combination thereof), and an audio output 208. The TLD 206 may also include a noise generator 207. System 200 can also include a consumer device, which may include a microphone 212 and a TLD circuit 214 (e.g., controller, processor, integrated circuit, or any combination thereof), and an output 216. The TLD 206 may also include a noise generator 207. The TLD 206 may be not in-line with a live speaker's microphone and audio amplifier, but may be a separate device, as shown in FIG. 2.

During operation, the system 200 may be utilized to provide a trust component to an audio output. The system 200 is a variation of the system 100 and can operate similar to the system 100, but instead of the TLD being in-line with the speaker's microphone and audio system, it can be a separate device transmitting a separate signal from the original audio output.

Thus, in system 200, when s_t is transmitted by a separate speaker, then, s_t=sound captured at the audio source;

s_s1=the sound emitted from the source audio system (e.g., via audio output 210);

s_s2=the sound emitted from the TLD device audio system (e.g., listening device 202);

s_r=the sound received at the recorder (consumer) end (e.g., via microphone 212);

f( )=a secret, invertible transfer function introduced by the TLD and known only by the TLD devices (e.g., TLD 206 and TLD 214); and w_k=a known, white noise function introduced by the TLD (e.g., via noise generator 207).

We then know that s_s1=s_t and s_s2=f(s_t)+w_k. Then, s_r=s_s1+s_s2. Thus, if s_r−f(s_t)−w_k−s_t=f_inv(s_t), then the signal can be determined to be authentic.

Figure 3:
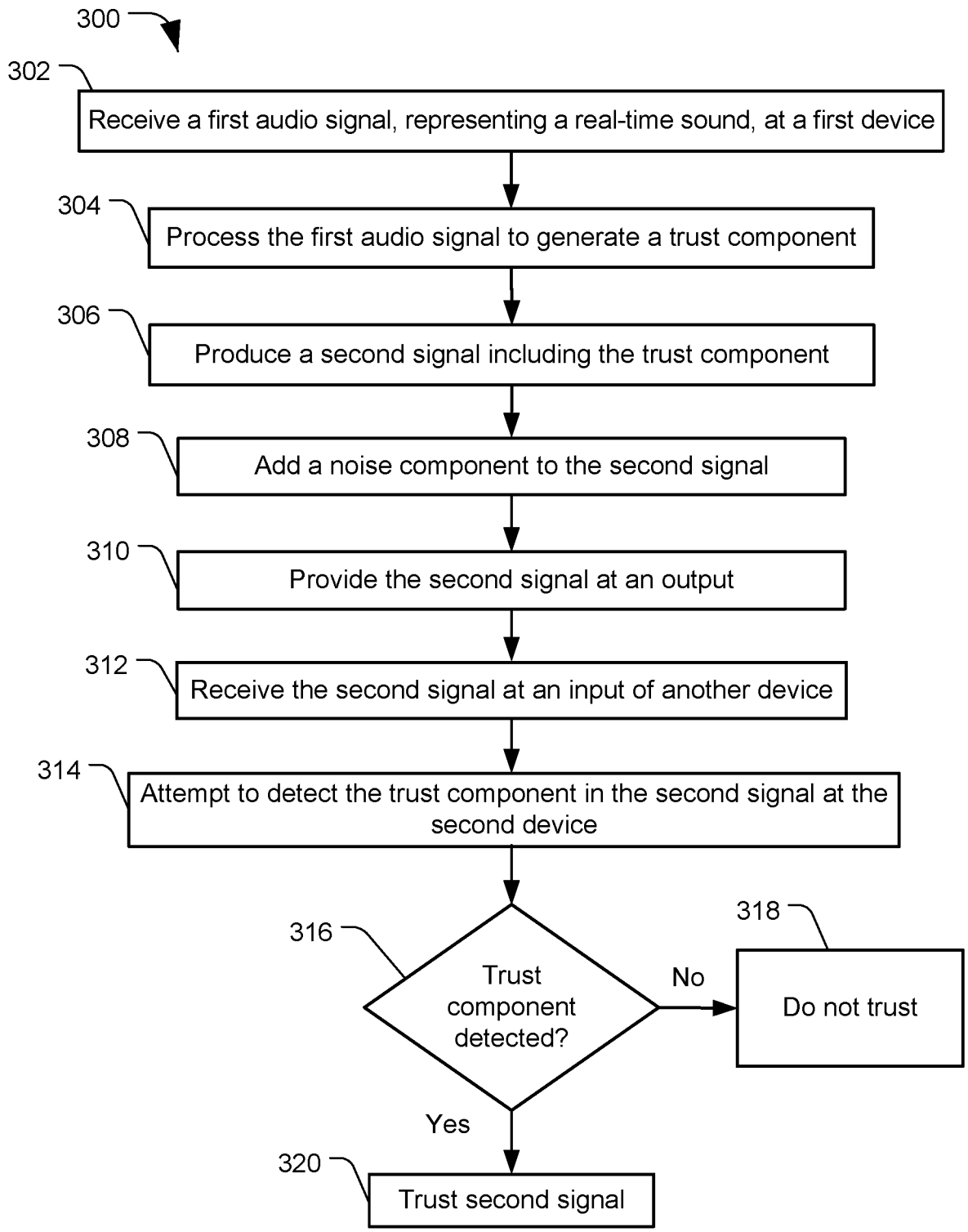
FIG. 3 depicts a flowchart of an example method for trusted listening, in accordance with certain embodiments of the present disclosure.

FIG. 3 shows a method for trusted listening, in accordance with certain embodiments of the present disclosure. The method can be implemented with the structures of FIG. 1 or FIG. 2 to provide authenticated audio signals.

The method 300 can include receiving a first audio signal representing a real-time sound at a first device, at 302; processing, via a processor of the first device, the first audio signal to generate a trust component (e.g., trusted signature in an audio component), at 304; produce a second audio signal including the trust component, at 306; and provide the second audio signal at a sound output of the first device, at 310. In some embodiments, the first device can add a noise component (e.g., white noise) to the second audio signal, at 308.

In further embodiments, to generate the trust component, the first device can monitor the first audio signal for major frequency constituents and encode a trusted signature into one or more detected major frequencies. The method 300 may embed the trusted signature in the second audio signal, such as by performing wavelet analysis on the first audio signal, and applying a modulated amplitude to one or more bins identified by the wavelet analysis.

The second audio signal may be received at a second device, at 312, and a verification process may detect or decode the second audio signal, at 314, and determine the authenticity thereof based on the trusted signature, at 316. When the verification process detects the trusted signature, the process may indicate via an output that the second signal can be trusted, at 320. When the verification process does not detect the trusted signature, the process may indicate via an output that the second signal cannot be trusted, at 318.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing this disclosure. Other embodiments may be utilized and derived from this disclosure, such that structural and logical substitutions and changes may be made without departing from the scope of this disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments and elements can be made, and other embodiments not specifically described herein will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   an audio receiving device including:
   a microphone configured to capture sound and produce an audio signal;
   a processing unit configured to:
   generate a trusted signature by applying an invertible transfer function to the audio signal;
   generate a white noise signal;
   monitor for major frequency constituents of the audio signal;
   generate a modified audio signal by adding (1) the white noise signal and (2) the trusted signature to the audio signal by encoding the trusted signature into the major frequency constituents; and
   an output configured to provide the modified audio signal at the output.

2. The apparatus of claim 1 further comprising the processing unit includes a noise generator configured to generate the white noise signal.

3. The apparatus of claim 2 further comprising the noise generator configured to generate the white noise signal based on a known white noise function.

4. The apparatus of claim 3 further comprising the processing unit configured to:
   monitor for major frequency constituents of the audio signal by performing wavelet analysis on the audio signal; and
   encoding the trusted signature into the major frequency constituents by applying a modulated amplitude to one or more bins identified by the wavelet analysis.

5. The apparatus of claim 1 further comprising the output includes a speaker to provide the audio signal as a sound output.

6. The apparatus of claim 5 further comprising another audio receiving device including a decoder configured to decode the audio signal and determine authenticity thereof based on the trusted signature.

7. The apparatus of claim 1 further comprising the audio receiving device is configured to be in-line with a live speaker's microphone and audio amplifier.

8. The apparatus of claim 1 further comprising the audio receiving device is a separate device not in-line with a live speaker's microphone and audio amplifier, and includes an output amplifier separate from the live speaker's audio amplifier.

9. A method comprising:
   receiving, at an input of a first device, a first audio signal representing a real-time sound;
   processing, via a circuit of the first device, the first audio signal to:
   generate a trusted signature by applying an invertible transfer function to the first audio signal;
   monitor for major frequency constituents of the first audio signal;
   generating, via a noise generator circuit of the first device, a first white noise signal;
   producing, at the first device, a second audio signal by combining the first audio signal with the first white noise signal and encoding the trusted signature into the major frequency constituents; and
   providing, at an output of the first device, the second audio signal.

10. The method of claim 9 further comprising generating the trusted signature by converting, via the invertible transfer function, the first audio signal to a signal that looks like a second white noise signal.

11. The method of claim 10 further comprising the first white noise signal generated based on a known white noise function.

12. The method of claim 11 further comprising:
    monitoring for major frequency constituents of the first audio signal by performing wavelet analysis on the first audio signal; and
    encoding the trusted signature into the major frequency constituents by applying a modulated amplitude to one or more bins identified by the wavelet analysis.

13. The method of claim 9 further comprising providing the second audio signal at an audio output.

14. The method of claim 13 further comprising receiving the second audio signal at a second device including a decoder configured to decode the second audio signal and determine authenticity thereof based on the trusted signature.

15. The method of claim 9 further comprising performing the processing of the first audio signal and outputting of the second audio signal with an in-line device between a live speaker's microphone and an audio amplifier.

16. A system comprising:
a first device including:
an input configured to receive a first signal representative of a first audio signal;
a white noise generator circuit configured to generate a first white noise signal;
a processing circuit processor configured to:
generate add a trusted signature by applying an invertible transfer function to the first audio signal to produce a second audio signal;
generate a second audio signal by combining the first white noise signal and the trusted signature with the first audio signal; and
an output configured to provide the second audio signal as an output signal of the first device.

17. The system of claim 16 further comprising the processing circuit configured to monitor the first audio signal for one or more major frequency constituents and encode the trusted signature into one or more detected major frequencies to produce the second audio signal.

18. The system of claim 17 further comprising:
the processing circuit configured to generate the trusted signature by converting, via the invertible transfer function, the first audio signal to a signal that looks like add a second white noise signal; and
the white noise generator circuit configured to generate the first white noise signal based on a known white noise function.

19. The system of claim 18 further comprising the processing circuit configured to:
monitor for the one or more major frequency constituents of the first audio signal by performing wavelet analysis on the first audio signal; and
encode the trusted signature into the one or more detected major frequencies by applying a modulated amplitude to one or more bins identified by the wavelet analysis.

20. The system of claim 16 further comprising:
a second device including:
an input configured to receive the second audio signal;
a decoder circuit configured to process the second audio signal and detect the trusted signature;
an output configured to provide an indication of whether the trusted signature was detected; and
a calibration component configured to calibrate reception of the trusted signature at the second device.

\* \* \* \* \*

UNITED STATES PATENT AND TRADEMARK OFFICE
CERTIFICATE OF CORRECTION

PATENT NO. : 11,295,758 B2
APPLICATION NO. : 16/825845
DATED : April 5, 2022
INVENTOR(S) : Kevin Arthur Gomez et al.

It is certified that error appears in the above-identified patent and that said Letters Patent is hereby corrected as shown below:

In the Claims

Column 7, Claim 16, Line 19, delete "add"

Signed and Sealed this
Twenty-sixth Day of July, 2022

Katherine Kelly Vidal
*Director of the United States Patent and Trademark Office*